United States Patent Office 3,651,039
Patented Mar. 21, 1972

3,651,039
β-ALANINE[1] AND γ-AMINOBUTYRIC ACID[1]-A.C.T.H. PEPTIDES
Masahiko Fujino, Takarazuka, Chitoshi Hatanaka, Kyoto, and Osamu Nishimura and Yasushi Sanno, Osaka, Japan, assignors to Takeda Chemical Industries, Ltd., Osaka, Japan
No Drawing. Filed Dec. 30, 1968, Ser. No. 788,066
Claims priority, application Japan, Dec. 29, 1967, 43/84,700, 43/84,701, 43/84,702; Feb. 8, 1968, 43/7,865; Feb. 9, 1968, 43/8,076, 43/8,077; Apr. 24, 1968, 43/27,565; Nov. 9, 1968, 43/82,160; Nov. 20, 1968, 43/85,113
Int. Cl. C07c 103/52
U.S. Cl. 260—112.5                    3 Claims

ABSTRACT OF THE DISCLOSURE

Novel peptide synthesis is provided, involving the use of compounds of the formula

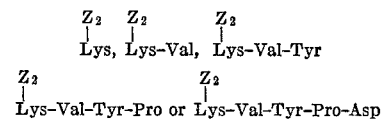

wherein A represents dichloromethyl or trichloromethyl, X represents chloro or nitro, and $n$ represents an integer of 1 to 5, inclusive, to form active esters with peptide fragments, said active esters reacting with other peptide fragments to effect condensation of the said peptide fragments. This novel process provides better yield and purity when compared with the use of N,N'-dicyclohexyl carbodiimide as a condensing agent. Novel peptides with ACTH-type activity have been prepared by this novel synthesis and include [β-alanine[1]]α-ACTH(1–23 amide), [γ-aminobutyric acid[1]]-ACTH(1–24) and [β-alanine[1]]-ACTH(1–24).

This invention relates to a novel and useful synthetic method for preparing compounds with adrenocorticotrophic hormone (ACTH)-type activity and related compounds.

More concretely stated, the present invention is concerned with a synthetic method for preparing compounds with ACTH-activity by the schema disclosed in reaction scheme I containing the description of general Formulae I–XVIII:

In the schema and throughout the present specification, working examples and claims, Ser, β-Ala, Tyr, Met, Glu, His, Phe, Arg, Try, Gly, Lys, Pro, Val, Asp and Gaba represent residues of serine, β-alanine, tyrosine, methionine, glutamic acid, histidine, phenylalanine, arginine, tryptophane, glycine, lysine, proline, valine, aspartic acid and γ-aminobutyric acid respectively, and the word "residue" mentioned above means a radical which is derived from the corresponding α-amino acid by eliminating the —OH group of the carboxyl group and an H of the α-amino group, i.e. stating with reference to lysine (NH$_2$(CH$_2$)$_4$CH(NH$_2$)COOH) for example, when lysine is represented by the formula NH$_2$—A—COOH (NH$_2$ is the α-amino radical), a radical of —NH—A—CO— is stated as "residue of lysine" and is abbreviated as "Lys,"

abbreviations for other α-amino acids mentioned above having the same meaning as the afore-illustrated one on lysine; $Z_1$ represents a substituent for protecting a terminal α-amino group of an α-amino acid, $Z_2$ represents a substituent for protecting an ε-amino group positioned on a side chain of lysine, $Z_3$ represents a substituent for protecting a guanidino group of arginine and OtBu represents a protective tertiary butoxy radical for protecting a carboxyl radical of glutamic acid, Q stands for Ser. D-Ser, β-Ala, Gly, Gaba, Y stands for

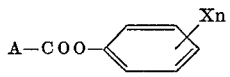

Y' stands for Lys, Lys-Val, Lys-Val-Tyr, Lys-Val-Tyr-Pro or Lys-Val-Pyr-Pro-Asp, P stands for an amido group or a protected or unprotected hydroxy group and R stands for a hydrocarbon radical, and the residue of amino acid means a residue of an L-amino acid except as otherwise stated.

In the compound of the Formula II, A stands for dichloromethyl or trichloromethyl, X stands for chloro- or nitro and $n$ stands for an integer of 1 to 5, inclusive.

Regarding the condensation of peptide fragments by the active ester method and particularly on the production of synthetic ACTH and its derivatives, there have been reported such methods as involving preparing active nitrophenol or trichlorophenol esters of an intermediate peptide by the use of N,N'-dicyclohexyl carbodiimide (DCCD) as a condensing agent, followed by reacting the ester with an other intermediate peptide and such ones as involving reacting directly intermediate peptides with one another by the use of DCCD as a condensing agent.

However, these methods give rise to a difficultly separable by-product acylurea as well as a sparingly soluble dicyclohexylurea and other by-products, and, accordingly, entail complicated procedures. Moreover, these methods depend on the use of costly and unstable starting materials, and the peptide yield is not sufficiently high.

They cannot therefore be considered advantageous as commercially feasible processes.

In the course of studies to overcome the foregoing difficulties and other disadvantages, the present inventors have unexpectedly found that a compound of the formula

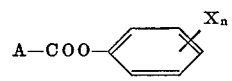

(wherein A, X and $n$ have respectively the same meaning as above) can react with a peptide component without using DCCD to give the corresponding active ester of the peptide component and that the thus prepared active ester of a peptide component can directly react with another peptide component without using DCCD to give a peptide compound of a larger molecular weight than the starting peptide components. The present invention is accomplished based upon the findings.

According to the present method, the afore-mentioned defects encountered in the known methods can be obviated and thus ACTH or its related peptide compounds can easily be produced in a rather high yield by a simple procedure without being accompanied by the formation of by-products and without using such starting materials or agents which are difficult to deal with.

Furthermore, on applying the present method, there can be produced novel peptides having a strong adrenocorticotropic hormone like activity.

Thus, the principal object of the present invention is to provide a novel and useful synthetic method for preparing ACTH or its related compounds including useful novel peptide compounds, and another is to provide useful novel peptides having a strong adrenocorticotropic hormone like activity.

Other objects and advantages of this invention will further become apparent hereinafter.

In the present method, as shown in the schema, starting, intermediate and desired peptides contain one or more protective substituents i.e. one or more of radicals $Z_1$, $Z_2$ and $Z_3$. The protective substituents may be any of the conventional ones, and the protective substituent $Z_1$ on a terminal α-amino group of an α-amino acid may be exemplified by such groups as t-butoxycarbonyl, t-amyloxycarbonyl, p-methoxybenzyloxycarbonyl, and o-nitrophenylsulfenyl, etc., the protective substituent $Z_2$ on a side-chain ε-amino group of lysine may be exemplified by benzyloxycarbonyl, and p-chlorobenzyloxycarbonyl, etc., and $Z_3$ on a guanidine group of arginine may be exemplified by nitro tosyl (p-toluenesulfonyl), etc.

Among these protective groups, there are desirably used t-butoxycarbonyl or t-amyloxycarbonyl for $Z_1$, carbobenzoxy or p-chlorobenzyloxycarbonyl for $Z_2$, and nitro for $Z_3$.

Additionally, throughout the present specification working examples and claims

means lysine wherein a hydrogen atom of the ε-amino group is replaced by the protective group $Z_2$,

means arginine wherein a hydrogen atom of its guanidine group is replaced by the protective group $Z_3$ (i.e.

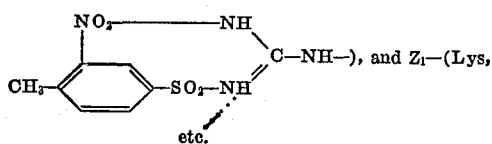

Phe, etc.) means an α-amino acid (Lys, Phe, etc.) wherein a hydrogen atom of its terminal amino group is replaced by the protective group $Z_1$.

Hereinafter, the present method is described referring to the schema.

First, a peptide of Formula I is reacted with a phenyl ester of Formula II preferably in the presence of a tertiary amine to produce an active ester of Formula III of said peptide (I), which is then condensed with a peptide of Formula IV having an N-terminal valyl group to obtain a peptide of Formula V and, finally, the protective substituent $Z_1$ on the terminal amino group of lysine residue is split off to produce a peptide of Formula V'.

On the other hand, an active ester of Formula VII is produced from a peptide of Formula VI in like manner, and this active ester (VII) is condensed with the peptide (V') prepared above, whereupon a peptide of Formula VIII is obtained. Then, the protective substituent $Z_1$ on the N-terminal amino group of the lysine residue is split off to obtain a peptide of Formula VIII'. This peptide (VIII') is further condensed with an active ester of Formula X derived from a peptide of Formula IX in the same manner as above, whereupon a peptide of Formula XI is obtained. Then, the protective substituent $Z_1$ on the amino group of its terminal phenylalanine is removed to obtain a peptide of Formula XI'.

A peptide ester of Formula XII is treated in a conventional manner to produce the corresponding azide of Formula XIII, which is condensed with the above-mentioned peptide (XI') to obtain a condensate of Formula XIV, whose protective group $Z_1$ is then split off, whereupon a peptide of Formula XIV' is obtained. This peptide (XIV') is condensed with an azide of Formula XVI derived from a peptide ester of Formula XV to obtain a peptide of Formula XVII having a terminal protective group. Finally, the last-mentioned peptide (XVII) is treated with hydrogen fluoride to remove all the protective substituents, whereupon a peptide of Formula XVIII is obtained.

In accordance with this invention, a starting material peptide (I, VI or IX) is reated with a phenyl ester of di-chloro- or trichloroacetic acid (II) preferably in the presence of a suitable tertiary amine to obtain an active intermediate phenyl ester (III, VII or X) which is then reacted with another peptide (IV, V' or VIII') to synthesize the corresponding peptide (V, VII or XI).

The respective starting peptides (I, VI and IX) may be synthesized in a conventional manner or by said "active ester method" from a corresponding amino acid or low molecular peptides.

The active ester method as it applies to the present invention will hereinafter be explained. Thus, as the reaction solvent, dimethylformamide, dimethylsulfoxide, dioxane, pyridine, etc. may be used either singly or in combination. The starting peptides may be either suspended or dissolved in such solvent. The tertiary amine mentioned above may be a tertiary aliphatic or aromatic one such as trialkylamines (e.g. trimethylamine, triethylamine, etc.), N-alkylpiperidine (e.g. N-methylpiperidine, N-ethylpiperidine, etc.), N-alkylmorpholine (e.g. N-methylmorpholine, N-ethylmorpholine, etc.) and the like.

Referring to the Formula II, the phenols represented by

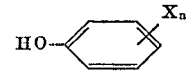

are compounds having one or more members selected from the class consisting of halogen and nitro, which members may be the same or different, e.g. 2,3,4,5,6-pentachlorophenol, 2,4,5- or 2,4,6-trichlorophenol, o-chlorophenol, 2,4-dinitrophenol, p-nitrophenol and the like. Among these compounds, pentachlorophenol, trichlorophenol and mononitrophenol are particularly beneficial.

The compound of the Formula II is used in an amount of 1 to 3 eq. mol., more desirably 1.1 to 1.5 eq. mol.

The reaction is generally conducted at a temperature ranging from about 60° to about —20° C. and slight heating may accelerate the reaction. The proper reaction time should be determined with reference to the reaction temperature and the type of phenyl ester (II) to be employed. Generally speaking, the preferred reaction time lies somewhere between 10 minutes and 6 hours.

The only by-product which arises in the resulting reaction mixture is the tertiary amine salt of di- or tri-chloroacetic acid, and the active ester (III, VII or X) can be isolated by precipitation from water or by extraction with a solvent and, if necessary, purified by, for example, recrystallization.

While the so-isolated active ester (III, VII or X) may be redissolved in the same solvent as above, followed by addition of a compound (IV, V' or VIII') thereto, it is more advantageous to add the above reaction mixture directly to a compound (IV, V' or VIII') to obtain the desired condensate (V, VIII or XI). This reaction is generally effected by allowing the system to stand at room temperature.

The group P of the compound (IV, V' or VIII') is an amido group or a protected or unprotected hydroxy group. The protected hydroxy group is exemplified by ester groups such as benzyl ester, methyl ester, ethyl ester, isobutyl ester, etc.

The said condensate (V, VIII or XI) can be isolated by adding water to the reaction mixture and, if required, can be purified in a suitable manner.

Then, only the protective group $Z_1$ of the condensate (V), (VIII) and (XI) is removed by hydrolysis to yield the compounds (V'), (VIII') and (XI'), respectively.

For this purpose, any of hitherto known techniques may be applicable.

For example, acids such as trifluoroacetic acid, hydrochloric acid in acetic acid or dioxane, formic acid, etc. are allowed to react with the compound (V), (VIII) or (XI). The hydrolysis can proceed by keeping a mixture of the compound (V), (VIII) or (XI) and the acid under a relatively low temperature, for example, at about 0° C. to room temperature in the presence of a solvent. The amount of the acid is about 5 to about 20 times, more desirably about 10 to about 20 times as much weight as that of the compound (V), (VIII) or (XI).

This peptitde (XII' or XIV') is converted to the peptide (XIV or XVII) by the so-called azide method for peptide synthesis.

Thus, according to the above reaction formulas, hydrazine hydrate is allowed to act upon the peptide ester (XII or XV) and, then, nitrous acid upon the resulting hydrazide in a conventional azide method. R, a hydrocarbon radical, in the Formulae XII and XV includes for example, an alkyl such as methyl, ethyl, propyl, butyl and amyl, an aryl such as phenyl and naphthyl, and an aralkyl such as benzyl and phenethyl.

Finally the resulting azide (XIII or XVI) is condensed with the peptide (XI' or XIV') to obtain the peptide (XIV or XVII).

As the azide method, any of the conventional ones is applicable, for example, the peptide ester (XII or XV) is reacted with hydrazine hydrate to obtain the corresponding hydrazide in powdery or crystalline form and, after it is suitably purified or by-passing such a purification step, a nitrite (e.g. sodium nitrite, potassium nitrite, etc.) is added to an aqueous solution of said hydrazide in the presence of an acid (e.g. hydrochloric acid, etc.), whereby the hydrazide is converted to the corresponding azide (XIII or XVI).

To facilitate the subsequent separation procedure, the treatment may be carried out in the presence of an inorganic salt such as sodium chloride, sodium sulfate, etc.

The resulting azide can be collected by salting-out or extracted and purified with an organic solvent such as ethyl acetate, ethyl ether, etc.

For the purpose of, for example, directly carrying out the subsequent condensation reaction, the above reaction may be conducted in the presence of an organic solvent used as the condensation solvent (i.e. dimethylformamide, dioxane, dimethylsulfoxide, pyridine).

In such a case, the product may be used as it is or, if necessary, after being dehydrated in the subsequent condensation reaction, and as the solvent for this condensation reaction, the above-mentioned solvents, as well as any other solvent capable of dissolving the starting azide and peptides, may be employed with equal success. Those solvents may also be used in suitable combinations. The reaction is preferably effected under neutral conditions by previously treating the starting materials with a tertiary amine such as triethylamine or tributylamine so as to make them neutral, and, if required, even in the course of reaction such an alkalifying agent as above may be added to the reaction system to maintain the neutral conditions.

The proper reaction temperature generally ranges from —20° to 0° C. and the proper reaction time from 5 hours to 3 days, although they should be selected to suit the requirement.

The peptide derivative (XVII) obtained above is subjected to acid decomposition with hydrogen fluoride so as to remove all the protective groups $Z_1$, $Z_2$ and $Z_3$, whereupon the desired product (XVIII) is obtained.

This reaction is conducted by allowing anhydrous hydrogen fluoride to contact with the compound (XVII) in the presence of a suitable organic solvent, the kind of which is optional insofar as it is not detrimental to the reaction.

Examples of such solvent, therefore, include trifluoroacetic acid and acetic acid. The amount of the hydrogen fluoride is about 10 to about 100, more desirably about 20 to about 50 relative to 1 weight part of the compound (XVII).

The reaction is generally conducted at temperatures between about —70° to about 30° C., and, for better results, under cooling at 0° to 5° C.

The reaction time may range from about 30 to 150 minutes, the optimun reaction time being selected case by case. After the reaction is complete, the hydrogen fluoride is distilled off under reduced pressure and the residue is purified in a conventional manner, e.g. by precipitation, column chromatography (adsorption, ion exchange, gel filtration, etc.) and the like.

By conducting the afore-described series of steps, the compounds of the Formula XVIII including ACTH can be produced.

The compounds represented by the Formula XVIII are novel compounds, except ACTH and a compound of the Formula XVIII wherein Q is Ser and Y'—P is Lys-Val-Tyr-Pro—OH.

All of these compounds have the same adrenocotricotropic hormone activity as ACTH and therefore can be used as medicines quite similarly to the known ACTH.

Especially, a compound of the Formula XVIII wherein Q is β-alanine, Y is Lys-Val-Tyr, P is $NH_2$ has a more effective adrenocorticotropic hormone like activity than that of the known ACTH, and can be administered intramuscularly, intraperitoneally or subcutaneously to human body, for the same purpose as ACTH, in a daily dose of about 0.01 to about 50 mg., more desirably, about 0.025 to about 5 mg. per adult in a form of tablet, granule, powder, capsule, injection, etc.

In the method of this invention which is described above, the active ester method is applied to the steps up to the production of intermediate peptide (XI') and the azide method is applied to the subsequent steps up to the synthesis of peptide (XVII), which is to be finally hydrolyzed with hydrogen fluoride to the desired end product (XVIII).

Salient features of this invention follow.

Since the active ester method is utilized as hereinbefore explained, the reaction mixture can be directly subjected to condensation with another peptide, by-passing the isolation and purification of the active ester, thus enabling the desired peptide to be synthesized in a nearly quantitative yield.

Furthermore, this invention is of considerable advantage, for it does not involve the use of DCCD, which is an essential reagent to be employed in the conventional methods, and accordingly, there will be encountered no by-product problems.

The isolation and purification of the products are easier because the fragments are successively condensed in such a manner that a relatively longer fragment is successively condensed with a relatively shorter fragment.

As the protective substituents for the functional groups, specifically selected groups are used and the cleavage of the protecting groups in the final steps of the process is advantageously effected in one operation by means of hydrogen fluoride.

The method of this invention will hereinafter be described in further detail by way of example.

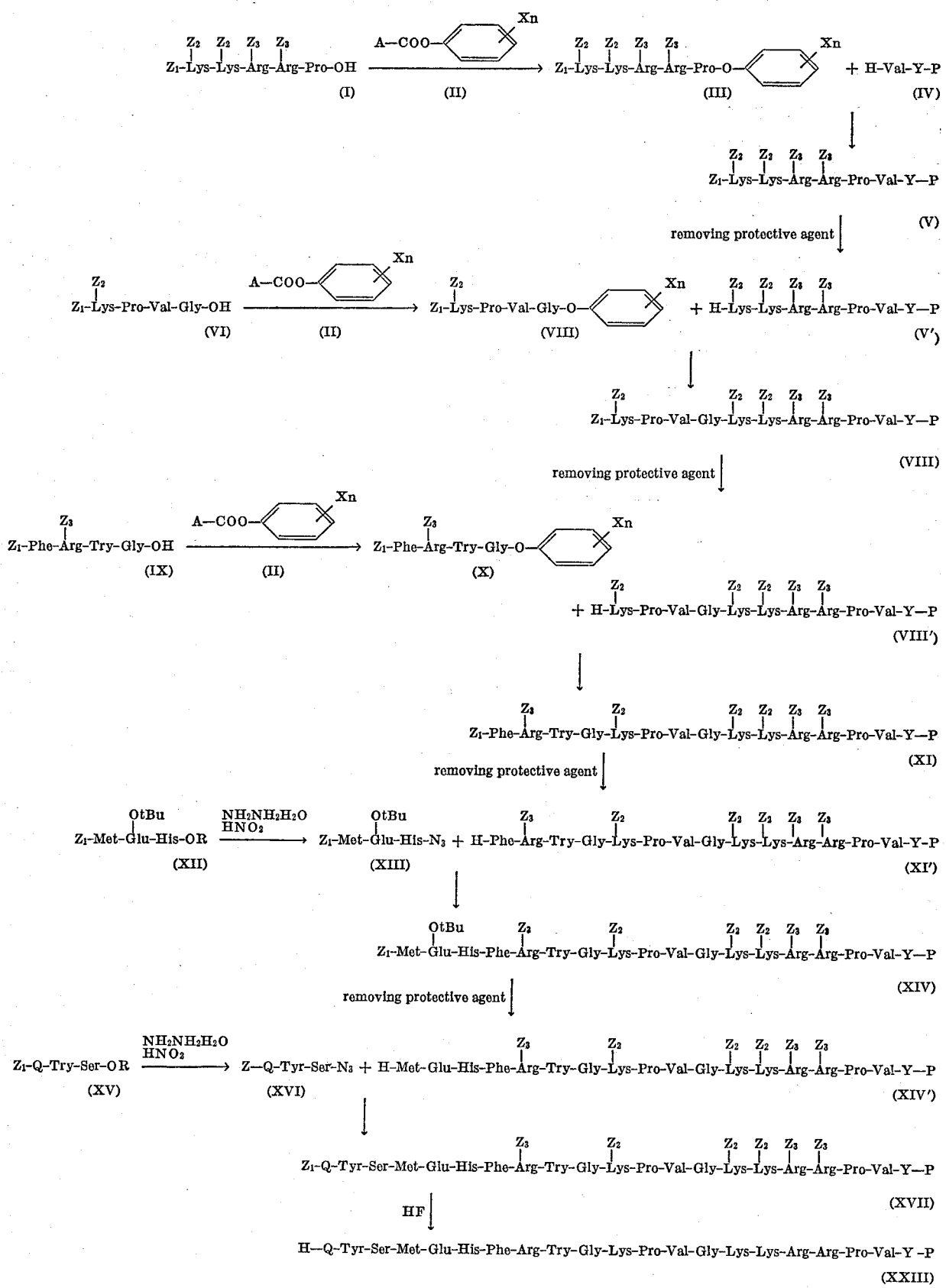
In the following examples, weight parts bear the same relationship to volume parts as do grams to milliliters, and Rf1, Rf2, Rf3 and Rf4 mean Rf value using a solvent system of (chloroform:methanol:acetic acid=9:1:0.5), (ethyl acetate:pyridine:acetic acid:water=60:20:6:11), (butanol:acetic acid:water=4:1:1) and (butanol:pyridine:acetic acid:water=30:20:6:24), respectively.

EXAMPLE 1

Production of H—Lys-Lys-Arg-Arg-Pro-Val-Lys-Val-Tyr-$NH_2$
($Z_2$: benzyloxycarbonyl, $Z_3$: nitro)

(1) 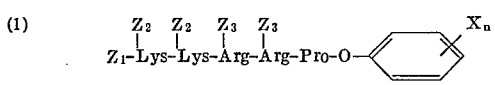
$Z_1$-Lys-Lys-Arg-Arg-Pro-O—

($Z_1$: t-butoxycarbonyl, X: chloro, $Z_2$: benzyloxycarbonyl, $Z_3$: nitro, $n$: 5).

In 2 volume parts of either dimethylformamide or pyridine is dissolved 1.16 weight part of

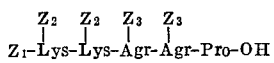
$Z_1$-Lys-Lys-Agr-Agr-Pro-OH which is prepared in the conventional manner [M.P. 94°–97° C. (decomp. with foaming), $[\alpha]_D^{21} = -2.65°$ (c.=1.0, in dimethylformamide), thin layer chromatography(silica gel) Rf1; 0.27].

Then, 1.4 volume part of 10% triethylamine-dimethylformamide is added dropwise while cooling, followed by the addition of 0.494 weight part of pentachlorophenyl trichloroacetate in its finely divided state. The mixture is vigorously stirred at 20° C. for 50–60 minutes, at the end of which time 40 volume parts of cold water is added. The reaction mixture is then allowed to stand in a cold place, and the resulting precipitates are washed with water and dried. Yield 1.27 weight part (90%), M.P. 89°–93° C. (Sinter), 113° C. (decomp. with foaming), thin layer chromatography (silica gel) Rf1; 0.68.

(2) 
$Z_1$-Lys-Lys-Arg-Arg-Pro-Val-Lys-Val-Tyr-$NH_2$
($Z_1$, $Z_2$ and $Z_3$ have the same meaning as above.)

In 3 volume parts of dimethylformamide is dissolved $Z_2$
|
H-Val-Lys-Val-Tyr-$NH_2$-trifluoroacetate followed by the addition, in droplets, of 10% triethylamine-dimethylformamide.

Under cooling, 1.13 weight part of

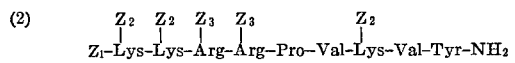
$Z_1$-Lys-Lys-Arg-Arg-Pro-O— prepared in (1) is added to the above solution, and the mixture is stirred for 1 hour at 5° C. and then overnight at room temperature. 30 volume parts of ethyl ether is added to the reaction mixture, and the resulting precipitates are collected by filtration.

The precipitates are dissolved under heating in 20 volume parts of methanol containing 0.2 volume part of acetic acid, and the solution is allowed to stand in a cold place. The precipitates are collected by filtration and washed with methanol. Yield 1.07 weight part (76%), M.P. 189°–191° C. (decomp. with foaming), $[\alpha]_D^{22} = -34.6°$ (c.=0.5, in dimethylformamide), thin layer chromatography (silica gel), Rf1; 0.24, Rf2; 0.80, Rf3; 0.99.

*Elemental analysis.*—Calculated for $C_{83}H_{121}O_{22}N_{21}$ (percent): C, 56.5; H, 7.0; N, 16.7. Found (percent): C, 56.1; H, 7.0; N, 16.9.

(3) 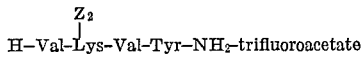
H—Lys-Lys-Arg-Arg-Pro-Val-Lys-Val-Tyr-$NH_2$ ($Z_2$ and $Z_3$ have the same meaning as above).

In 4 volume parts of cold trifluoroacetic acid is dissolved 0.700 weight part of

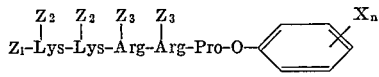
$Z_1$—Lys-Lys-Arg-Arg-Pro-Val-Lys-Val-Tyr-$NH_2$ prepared in (2) above, and the resulting solution is allower to stand at 15° C. for 30 minutes. Alternatively, the above compound is dissolved in 20 volume parts of 99% formic acid and the solution is allowed to stand at 25° for 3 hours. Absolute ether is then added to the solution (where formic acid is used, it is distilled off at 30° C. under reduced pressure, followed by the addition of ethyl ether), and the resulting precipitates are collected by filtration, washed with ethyl ether and dried. In either case, the corresponding salt of the desired product is obtained in quantitative yield.

The thin layer chromatogram (silica gel) of the reaction product gives the following Rf values.

Rf3; 0.80
Rf2; 0.54
Dioxane: $H_2O$ (9;1) 0.82
Rf1; 0.00

Each mixed solvent yields a single ninhydrin-positive spot.

The compound

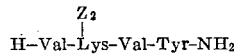
H-Val-Lys-Val-Tyr-$NH_2$ which is used in (2), can be prepared in the following manner.

In 10 volume parts of trifluoroacetic acid is dissolved 0.587 weight part of

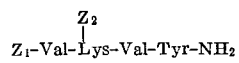
$Z_1$-Val-Lys-Val-Tyr-$NH_2$ which is prepared by the conventional method [M.P. 215°–217° C. (decomp.), $(\alpha)_D^{22} = -18.3°$ (c.=1.0, in dimethylformamide), thin layer chromatography (silica gel) Rf1; 0.59, Rf3; 0.95]

The solution is allowed to stand at room temperature for 30 minutes, at the end of which time the trifluoroacetic acid is distilled off at 30° C. under reduced pressure. Absolute ethyl ether is added, and the precipitates are collected by filtration in the form of a powder which is dried. The above procedure gives

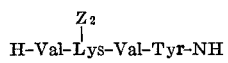
H-Val-Lys-Val-Tyr-NH trifluoroacetate in quantitative yield. Thin layer chromatography (silica gel) Rf1; 0.0, Rf3; 0.71.

Production of

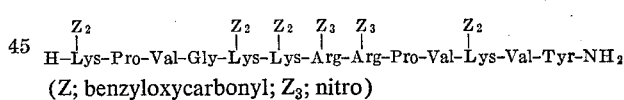
H—Lys-Pro-Val-Gly-Lys-Lys-Arg-Arg-Pro-Val-Lys-Val-Tyr-$NH_2$
(Z; benzyloxycarbonyl; $Z_3$; nitro)

(1) 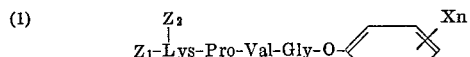
$Z_1$-Lys-Pro-Val-Gly-O—

($Z_1$: t-butoxycarbonyl; X: chloro; $Z_2$: benzyloxycarbonyl; $Z_3$: nitro; $n$: 5)

1.94 weight part of

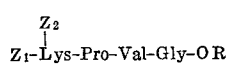
$Z_1$-Lys-Pro-Val-Gly-OR (R: methyl), which is prepared by the conventional method [M.P. 75.0°–79.0° C., $(\alpha)_D^{26} = -81.0°$ (c.=1.0, in methanol)],

*Elemental analysis.*—Calculated for $C_{32}H_{49}O_9N_5$ (percent): C, 59.33; H, 7.62; N, 10.81. Found (percent): C, 59.41; H, 7.77; N, 10.79, is saponified wit ha molecular equivalent of N-sodium hydroxide in methanol, and the resulting

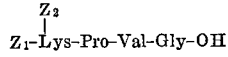
$Z_1$-Lys-Pro-Val-Gly-OH (oily substance) is dissolved in 5 volume parts of dimethylformamide.

To this solution is added 0.52 volume part of triethylamine under cooling with ice, followed by the addition of 1.24 weight part of pentachlorophenyl trichloroacetate.

The mixture is shaken at room temperature for 20 minutes, at the end of which time 15 volume parts of cold water is added. The resulting precipitates are collected by filtration, washed with water, and dried. The precipitates are suspended in 20 volume parts of boiling methanol, and after cooling, the powdery precipitates are collected by filtration. Yield 2.0 weight parts (74% relative to ester), M.P. 188.0°–190° C. (decomp.), $(\alpha)_D^{23}= -36.7°$ (c.=1.0, in dimethylformamide), thin layer chromatography (silica gel) Rf1; 0.89.

*Elemental analysis.* — Calculated for $C_{37}H_{46}O_9N_5Cl_5$ (percent): C, 50.38; H, 5.26; N, 7.94; Cl, 20.12. Found (percent): C, 50.23; H, 5.49; N, 7.89; Cl, 20.31.

(2)

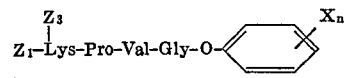

Z₁–Lys-Pro-Val-Gly-Lys-Lys-Arg-Arg-Pro-Val-Lys-Val-Tyr-NH ($Z_1$, $Z_2$ and $Z_3$ have the same meaning as above).

The formate or trifluoroacetate of

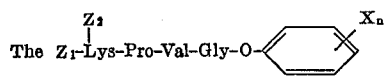

H-Lys-Lys-Arg-Arg-Pro-Val-Lys-Val-Tyr-NH₂ is dissolved in 5 volume parts of dimethylformamide, followed by the addition of 0.56 volume part of 10% triethylamine-dimethylformamide. To this solution is added 0.353 weight part of the Z₁–Lys-Pro-Val-Gly-O—⟨ ⟩—X_n prepared in above (1), and the mixture is vigorously stirred.

The Z₁–Lys-Pro-Val-Gly-O—⟨ ⟩—X_n remains suspended during the beginning of the reaction, but is completely dissolved when stirred overnight. To the reaction mixture is added 30 volume parts of cold N-aqueous ammonia, and the resulting precipitates are collected by filtration and washed with water. Then it is washed with a 10% aqueous solution of acetic acid, and after washing with water a second time, is dried. Yield 0.840 weight part (92%).

(2)

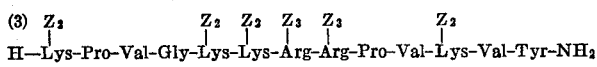

Z₁—Phe-Arg-Try-Gly-Lys-Pro-Val-Gly-Lys-Lys-Arg-Arg-Pro-Val-Lys-Val-Tyr-NH₂

This crude product is suspended in 20 volume parts of methanol containing a small amount of dimethylformamide, and the suspension is heated. After cooling, the precipitates are collected by filtration. Yield 0.747 weight part (81%), M.P. 194°–196° C., $(\alpha)_D^{22}= -36.0°$ (c.=1.0, in dimethylformamide).

*Elemental analysis.* — Calculated for $C_{109}H_{158}O_{28}N_{26}$ (percent): C, 57.4; H, 6.8; N, 16.0. Found (percent): C, 56.8; H, 6.9; N, 16.0; amino acid analysis (hydrolyzed in 6 N-hydrochloric acid at 105° C. for 12 hours)—Gly 0.96, Pro 2.12, Val 3.00, Lys+Arg 6.10, Tyr 0.38 (somewhat undervalued because of partial alkylation).

(3)

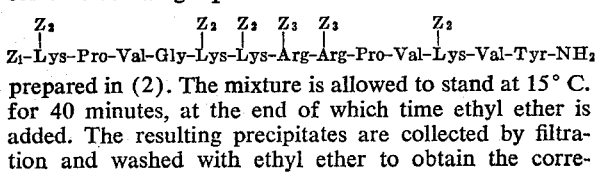

H—Lys-Pro-Val-Gly-Lys-Lys-Arg-Arg-Pro-Val-Lys-Val-Tyr-NH₂

($Z_2$ and $Z_3$ have the same meaning as above);

In 5 volume parts of cold trifluoroacetic acid is dissolved 0.684 weight part of the Z₁–Lys-Pro-Val-Gly-Lys-Lys-Arg-Arg-Pro-Val-Lys-Val-Tyr-NH₂ prepared in (2). The mixture is allowed to stand at 15° C. for 40 minutes, at the end of which time ethyl ether is added. The resulting precipitates are collected by filtration and washed with ethyl ether to obtain the corresponding salt of the desired product in quantitative yield. Thin layer chromatography (silica gel) Rf3; 0.61, dioxane:H₂O (9:1) Rf=0.47; Rf1; 0.00, singly spots positive to ninhydrin and anthranilic acid.

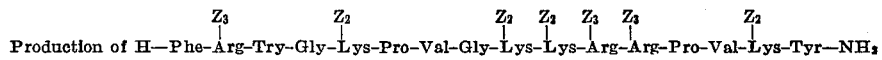

Production of H—Phe-Arg-Try-Gly-Lys-Pro-Val-Gly-Lys-Lys-Arg-Arg-Pro-Val-Lys-Tyr-NH₂

($Z_2$: benzyloxycarbonyl; $Z_3$: nitro)

(1)

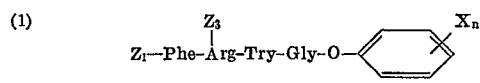

Z₁—Phe-Arg-Try-Gly-O—⟨ ⟩—X_n ($Z_1$: t-butoxycarbonyl; X: chloro; n: 5);

In 5 volume parts of pyridine is dissolved 1.43 weight part of

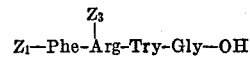

Z₁—Phe-Arg-Try-Gly—OH which has been prepared by the conventional method [M.P. 144°–146° C. (decomp.), $(\alpha)_D^{26}= -22.3°$ (c.=1.0, in methanol).

*Elemental analysis.*—Calculated for $C_{33}H_{43}O_9N_9 \cdot \frac{1}{2}H_2O$ (percent): C, 55.14; H, 6.18; N, 17.51. Found (percent): C, 55.17; H, 6.02; N, 17.62; thin layer chromatography (silica gel) Rf1; 0.25 (positive Ehrlich's reaction)]. Then, 0.28 volume part of triethylamine is added to the above solution under cooling, followed by the addition of 1.24 weight part of pentachlorophenyl trichloroacetate. The mixture is shaken at room temperature for 40 minutes, at the end of which time the reaction mixture is cooled with ice, followed by the addition of 20 volume parts of cold water to obtain precipitates. The precipitates are collected by filtration, washed with water and dried. The precipitates are suspended in 20 volume parts of methanol and after boiling, the suspension is allowed to stand in the cold. The precipitates are collected by filtration. Yield 1.80 weight part (90.5%), M.P. 170°–172° C. (decomp.), $(\alpha)_D^{23}= -7.8°$ (c.=1.0, in dimethylformamide), thin layer chromatography (silica gel) Rf1; 0.70.

*Elemental analysis.*—Calculated for $C_{36}H_{42}O_9N_9Cl_5$ (percent): C, 48.88; H, 4.42; N, 13.16; Cl, 18.51. Found (percent): C, 48.67; H, 4.52; N, 12.95; Cl, 18.49.

($Z_1$, $Z_2$ and $Z_3$ have the same meaning as above);

The formate or trifluoroacetate of

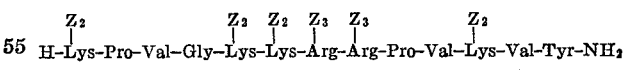

H-Lys-Pro-Val-Gly-Lys-Lys-Arg-Arg-Pro-Val-Lys-Val-Tyr-NH₂ is dissolved in 3 volume parts of dimethylformamide, followed by the addition of 0.42 volume part of 10% triethylamine - dimethylformamide. To this solution is added 0.288 weight part of the

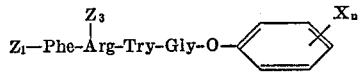

Z₁—Phe-Arg-Try-Gly-O—⟨ ⟩—X_n prepared in (1), and the mixture is stirred overnight. Next morning, cold 0.5 N-aqueous ammonia is added, and the resulting precipitates are collected by filtration and washed with water and then, with a 10% aqueous solution of acetic acid. Finally, it is dissolved in 10 volume parts of methanol containing 0.1 volume part of acetic acid. The solution is allowed to stand in a cold place and the resulting powder is collected by filtration and washed with cold methanol. Yield 0.769 weight part (89.3%). Recrystallized from dimethylformamide-methanol: M.P. 186°–187° C. (decomp.); thin layer chromatography (silica gel) Rf1; 0.0 (positive Ehrlich's, α-nitroso β-naphthol reactions).

*Elemental analysis.*—Calcd. for $C_{137}H_{191}O_{34}N_{35} \cdot 4H_2O$ (percent): C, 55.9; H, 6.8; N, 16.7. Found (percent): C, 55.8; H, 6.8; N, 16.7; amino acid analysis (hydrolyzed in 6 N-hydrochloric acid at 110° C. for 12 hours)—theoretical: Gly 2, Pro 2, Val 3, Phe 1, Lys+Arg 7; found Gly 2.0, Pro 2.0, Val 2.8, Phe 1.0, Lys+Arg 6.8. After treatment with trifluoroacetic acid, thin layer chromatography (silica gel) Rf3; 0.80 dioxane: $H_2O$ (9:1) Rf=0.90; Rf1: 0.00, single spots positive to ninhydrin and Ehrlich's reagent.

(3)

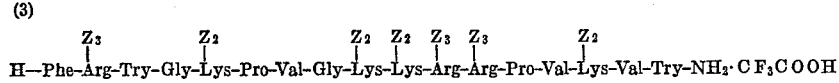

$$H-Phe-\underset{Z_3}{Arg}-Try-Gly-\underset{Z_2}{Lys}-Pro-Val-Gly-\underset{Z_2}{Lys}-\underset{Z_2}{Lys}-\underset{Z_3}{Arg}-\underset{Z_3}{Arg}-Pro-Val-\underset{Z_2}{Lys}-Val-Tyr-NH_2$$

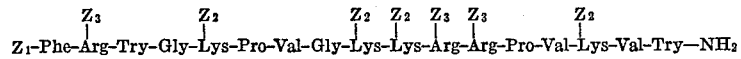

$$H-Phe-\underset{Z_3}{Arg}-Try-Gly-\underset{Z_2}{Lys}-Pro-Val-Gly-\underset{Z_2}{Lys}-\underset{Z_2}{Lys}-\underset{Z_3}{Arg}-\underset{Z_3}{Arg}-Pro-Val-\underset{Z_2}{Lys}-Val-Try-NH_2 \cdot CF_3COOH$$

($Z_2$ and $Z_3$ have the same meaning as above);

In 5 volume parts of ice-cooled trifluoroacetic acid is dissolved 0.576 weight part of $$Z_1-Phe-\underset{Z_3}{Arg}-Try-Gly-\underset{Z_2}{Lys}-Pro-Val-Gly-\underset{Z_2}{Lys}-\underset{Z_2}{Lys}-\underset{Z_3}{Arg}-\underset{Z_3}{Arg}-Pro-Val-\underset{Z_2}{Lys}-Val-Try-NH_2$$

prepared in (2), and the resulting solution is stirred in a nitrogen stream at 10° C. for 35 minutes, at the end of which time 30 volume parts of ethyl ether is added to obtain the precipitates. The precipitates are collected by suction filtration, washed with ethyl ether and dried over a sodium hydroxide under reduced pressure to give the trifluoroacetate of the desired peptide derivative in quantitative yield. Thin layer chromatography (silica gel) Rf2; 0.50, Rf3; 0.78; positive ninhydrin (amino) and Ehrlich's (indole) reactions.

Production of $H-Met-Glu-His-Phe-\underset{Z_3}{Arg}-Try-Gly-\underset{Z_2}{Lys}-Pro-Val-Gly-\underset{Z_2}{Lys}-\underset{Z_2}{Lys}-\underset{Z_3}{Arg}-\underset{Z_3}{Arg}-Pro-Val-\underset{Z_2}{Lys}-Val-Try-NH_2$ ($Z_2$; benzyloxycarbonyl, $Z_3$: nitro):

(1)

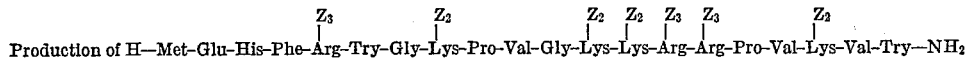

$$Z_1-Met-Glu-His-Phe-\underset{Z_3}{Arg}-Try-Gly-\underset{Z_2}{Lys}-Pro-Val-Gly-\underset{Z_2}{Lys}-\underset{Z_2}{Lys}-\underset{Z_3}{Arg}-\underset{Z_3}{Arg}-Pro-Val-\underset{Z_2}{Lys}-Try-NH_2$$

($Z_1$: t-butoxycarbonyl);

In 3.5 volume parts of a saturated aqueous solution of sodium chloride is suspended 0.132 weight part of

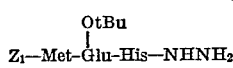

$Z_1-Met-\overset{OtBu}{\underset{|}{Glu}}-His-NHNH_2$ which has been prepared from

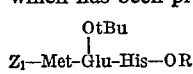

$Z_1-Met-\overset{OtBu}{\underset{|}{Glu}}-His-OR$ (R: methyl) in a conventional manner [(M.P. 174°–176° C., $(\alpha)_D^{23}=-31.0°$ (c.=1.0, in methanol).

*Elementary analysis.*—Calculated for $C_{25}H_{43}N_7O_7S$ (percent): C, 51.26; H, 7.40; N, 17.74. Found (percent): C, 51.17; H, 7.31; N, 16.59; S, 5.49)].

After the suspension is cooled to —5° C., 2.2 volume parts of ice-cooled N-hydrochloric acid is added so as to dissolve the compound.

To this solution is added 0.26 volume part of N-aqueous solution of sodium nitrite, and the mixture is stirred at 0° C. for 10 minutes, at the end of which time 10 volume parts of a 5% aqueous solution of sodium bicarbonate is added. The mixture is extracted with two 3 volume parts portions of ice-cooled ethyl acetate, and the combined extract is washed with a 5% aqueous solution of sodium bicarbonate and water, followed by drying over sodium sulfate. To this ethyl acetate solution of

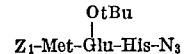

$Z_1-Met-\overset{OtBu}{\underset{|}{Glu}}-His-N_3$ is added the solution, which is prepared by dissolving in 10 volume parts of dimethylformamide

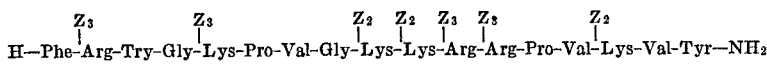

$$H-Phe-\underset{Z_3}{Arg}-Try-Gly-\underset{Z_2}{Lys}-Pro-Val-Gly-\underset{Z_2}{Lys}-\underset{Z_2}{Lys}-\underset{Z_3}{Arg}-\underset{Z_3}{Arg}-Pro-Val-\underset{Z_2}{Lys}-Val-Tyr-NH_2$$

followed by the addition of 10% triethylamine-dimethylformamide, and the mixture is cooled to —10° C.

The resulting mixture is stirred at 0° C. for 12 hours and at 5° C. for the further 12 hours, followed by the addition of ethyl acetate to give gel like precipitates. The precipitates are collected centrifugally or by suction filtration and re-precipitated from acetic acid-methanol to yield 0.489 weight part (73%) of white powder, M.P. 202°–204° C. (decomp.); $(\alpha)_D^{22}=-34.2°$ (c.=0.5, in dimethylformamide). *Elemental analysis.*—Calculated for $C_{157}H_{222}O_{37}N_{40}S$ (percent): C, 56.5; H, 6.7; N, 16.8; S, 1.0. Found (percent): C, 55.1; H, 6.8; N, 16.8; S, 1.2; thin layer chromatography (silica gel) Rf2; 0.60, Rf3; 0.83, single spot which gives positive Ehrlich's (indole) and Pauly's (imidazole) reactions and negative ninhydrin (amino) reaction; amino acid analysis (hydrolyzed in 6 N-hydrochloric acid at 110° C. for 20 hours)—theoretical: Glu 1, Gly 2, Pro 2, Val 3, Phe 1, Lys 4, His 1, Arg 3, Met 1, Tyr 1; found Glu 1.2, Gly 2.0, Pro 1.9, Val 2.8, Phe 1.0, Lys 4.0, His 1.0, Arg 2.6, Met 0.6, Tyr 0.3 (Tyr, Met and Arg are partially, and Try is completely, decomposed of alkylated).

(2)

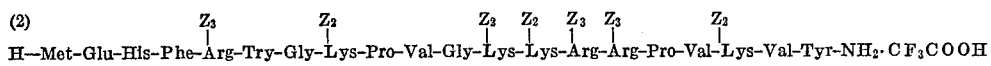

$$H-Met-Glu-His-Phe-\underset{Z_3}{Arg}-Try-Gly-\underset{Z_2}{Lys}-Pro-Val-Gly-\underset{Z_2}{Lys}-\underset{Z_2}{Lys}-\underset{Z_3}{Arg}-\underset{Z_3}{Arg}-Pro-Val-\underset{Z_2}{Lys}-Val-Tyr-NH_2 \cdot CF_3COOH$$

($Z_2$ and $Z_3$ have the same means as above);

In 4 volume parts of ice-cooled trifluoroacetic acid is dissolved 0.188 weight part of a $Z_1$-eicosapeptide derivative prepared above (1), and the resulting solution is stirred in a nitrogen-stream for 40 minutes, at the end of which time ice-cooled ethyl ether is added to give the precipitates. The precipitates are collected by filtration and dried over sodium hydroxide. The above procedure yields the trifluoroacetate of the eicosapeptide derivative freed of the $Z_1$-group and t-butylester on glutamic acid component.

Thin layer chromatography (silica gel) Rf2; 0.0, Rf3; 0.52, positive ninhydrin, Pauly's and Ehrlich's reactions.

Production of H—Ser-Tyr-Ser-Met-Glu-His-Phe-Arg-Try-Gly-Lys-Pro-Val-Gly - Lys - Lys-Arg-Arg-Pro-Val-Lys-Val-Tyr—NH₂:

(1)
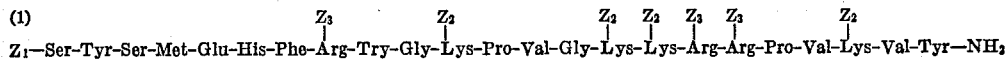

$Z_1$: t-butoxycarbonyl, $Z_2$: benzyloxycarbonyl, $Z_3$: nitro).

In 2 volume parts of dimethylformamide is suspended 0.05035 weight part of $Z_1$—Ser-Tyr-Ser—NHNH₂, a tripeptide derivative prepared in a conventional manner by reacting $Z_1$—Ser-Tyr-Ser—OR (R: methyl) with hydrazine hydrate. To the suspension is dissolved 0.1 volume part of 4 N-hydrochloric acid to give the solution, and then the solution is stirred at −5° C., followed by addition 0.06 volume part of ice-cooled 2 N-aqueous solution of sodium nitrite. The mixture is stirred at −5° C. for further 30 minutes, at the end of which time it is neutralized with 0.56 volume part of 10% triethylamine-dimethylformamide and dehydrated over sodium sulfate at below 0° C. for 20 minutes. The sodium sulfate is removed by filtration.

The resulting $Z_1$—Ser-Tyr-Ser—N₃ solution is added to a dimethylformamide solution of the eicosapeptide derivative trifluoroacetate, 2 volume parts prepared as above, followed by the addition of 0.22 volume part of 10% triethylamine-dimethylformamide. The mixture is stirred at −2° C. for 26 hours and at 0° C. for further 20 hours. To this reaction mixture is added the same amide solution (½ volume) as above, and after the mixture is stirred at 0° C. for 24 hours, cold ethyl acetate is added. The resulting precipitates are collected by filtration, dissolved in glacial acetic acid, and recrystallized from methanol to yield 0.160 weight part (77%) of the desired tricosapeptide derivative. $(\alpha)_D^{24}=31.8°$ (c.=0.5, in dimethylformamide).

*Elemental analysis.*—Calculated for $C_{171}H_{231}O_{43}S \cdot 4H_2O$ (percent): C, 55.3; H, 6.5; N, 16.2; S, 0.9. Found (percent): C, 55.2; H, 6.5; N, 16.3; S, 0.8.

Thin layer chromatography (silica gel) Rf2; 0.41, Rf3; 0.73, Rf4; 0.85; negative ninhydrin and positive Ehrlich's and Pauly's reactions.

(2) H—Ser-Tyr-Ser-Met - Glu - His-Phe-Arg-Try-Gly-Lys-Pro-Val - Gly-Lys - Lys-Arg - Arg-Pro - Val-Lys-Val-Tyr—NH₂.—In 0.5 volume part of cold trifluoroacetic acid is dissolved 0.150 weight part of the above tricosapeptide derivative, and the solution is shaken together with 0.2 volume part of anisol. The solution is cooled in a Dry-Ice-methanol bath, and 10 volume parts of anhydrous hydrogen fluoride is passed into the solution.

The mixture is stirred at 0° C. for 30 to 60 minutes, followed by distilling hydrogen fluoride under reduced pressure. The residue is dried over sodium hydroxide and dissolved in 5 volume parts of water, followed by adding 0.1 volume part of thioglycollic acid. The mixture is shaken in a nitrogen gas stream at 50° C. for 12 hours. The solution is passed through a column (0.5 x 10 cm.) of Amberlite IRA–410 (acetate form), then the column is washed with water. The effluent combined with the aqueous washing is promptly passed through a column (1 x 17 cm.) of carbomethoxy cellulose (buffered with 0.02 N-ammonium acetate, pH 6.0).

After the column is washed with 0.2 mol. (pH 6.8) buffer, it is further washed with 0.5 mol (pH 6.8), buffer, whereupon the desired product is eluted out.

When this product is lyophilized, 0.060 weight part of β (1–23 NH₂)-corticotropin is obtained. The thin layer of this product give a single spot which gives positive ninhydrin, Ehrlich's, Pauly's and Sakaguchi's (guanidyl) reactions.

Thin layer chromatography; Rf2; 0.0, Rf3; 0.0, Rf4; 0.54.

Thin layer chromatography; Rf2; 0.0, Rf3; 0.0, Rf4; 0.54.

Paper electrophoresis (2 N-acetic acid, 500 v):
  60 min. 8.5 cm.
  100 min. 13.7 cm. (migration toward negative (−) electrode)

$(\alpha)_D^{22}=-73.0 \pm 3.4°$ (1% acetic acid),

UV $\lambda_{max.}^{0.1-NaOH}$ m$\mu$ ($^{1\%}_{1cm.}$)

283.5 (24.79), 290 (25.73).

Amino acid analysis.—Theoretical: Glu 1, Ser 2, Gly 2, Pro 2, Val 3, Met 1, Tyr 2, Phe 1, Ls 4, His 1, Arg 3. Found: Glu 1.0, Ser 2.0, Gly 1.9, Val 2.9, Met 0.9, Tyr 2.0, Phe 1.0, Yys 3.9, His 1.1, Arg 3.0 (average recovery rate 93%).

EXAMPLE 2

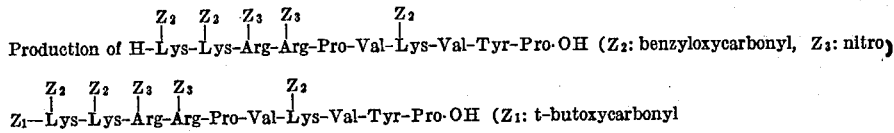

In 15 volume parts of cold trifluoroacetic acid is dissolved 3.3 weight parts of

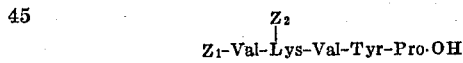

and the resulting solution is stirred at lower than 15° C. for 10 minutes, followed by distillation under reduced pressure to remove trifluoroacetic acid. Cold ethyl ether is added to the residue to yield precipitates. The precipitates are collected by filtration, washed with ethyl ether and dried. (Rf1; 0.00, Rf2; 0.46, Rf3; 0.60, Rf4; 0.73.)

In 50 volume parts of dimethylformamide is dissolved the precipitates, and to the solution is added 1.2 volume part of triethylamine under cooling and 5.9 weight parts

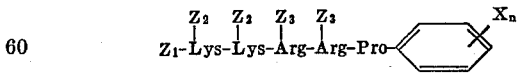

(X: Cl, n: 5) prepared in Example 1—(1), followed by stirring for 12 hours at room temperature.

1 volume part of glacial acetic acid and 150 volume parts of cold ethyl ether are added to the reaction mixture, and the resulting precipitates are collected by filtration. The precipitates are washed with ethyl ether and purified by re-precipitation from ethanol-ethyl ether. Yield 7.2 weight parts (96%). Thus yielded precipitates are further purified by precipitation from ethanol containing a small amount of water. Yield 6.2 weight parts (82%), melting point: 168° C. (decomposition, sintering at 127° C.), $(\alpha)_D^{22}=-36.7°$ (c.=1.0, in dimethyl formamide), Rf1; 0.16, Rf2; 0.81, Rf3; 0.89.

*Elemental analysis.*—Calculated for $C_{88}H_{127}O_{24}N_{21}H_2O$ (percent): C, 56.18; H, 6.91; N, 15.64. Found (percent): C, 55.99; H, 6.91; N, 15.88.

The compound

which is used in (1) as the starting material is prepared by the following manner:

In 10 volume parts of cold trifluoroacetic acid is dissolved 2.4 weight parts of

(tBu: tertiary butyl) which is prepared from $Z_1$—Val—Tyr—OMe (Me: methyl) by a conventional manner. The solution is stirred at lower than 15° C. for 15 minutes, at the end of which time the trifluoroacetic acid is removed by distillation under reduced pressure for 7 minutes. 20 volume parts of cold ethyl ether is added to the residue to yield precipitates. The precipitates are collected by filtration washed with ethyl ether and dried over sodium hydroxide under reduced pressure. (Rf1: 0.0, Rf2: 0.59, Rf3: 0.71)

In a mixture of 15 volume parts of dimethylformamide and 5 volume parts of water is dissolved the dry powdery substance prepared as above, followed by addition of 1 volume part of triethylamine. To the solution is immediately added 1.13 weight part of $Z_1$—Val—OHSu (N-hydroxysuccinimide ester), followed by vigorously stirring for 6 hours, at the end of which time 1 volume part of glacial acetic acid and 50 volume parts of cold water are added thereto to yield precipitates. The precipitates are collected by filtration, washed with water and re-precipitated from methanol-ethyl ether. Yield; 2.4 weight parts (84%), melting point; 143 to 146° C. (decomposition), $(\alpha)_D^{23} = -65.4°$ (c.=1.0, in dimethylformamide), Rf1: 0.65, Rf2; 0.80.

*Elemental analysis.*—Calculated for $C_{42}H_{60}O_{11}N_6$ (percent): C, 61.14; H, 7.33; N, 10.19. Found (percent): C, 61.20; H, 7.59; N, 9.91.

(2)

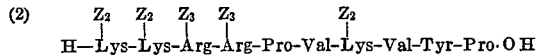

($Z_2$ and $Z_3$ have the same meaning as above).

In 15 volume parts of ice-cooled trifluoroacetic acid is dissolved 2.32 weight parts of

which is prepared in the above (1), and the resulting solution is stirred at lower than 15° C. for 15 minutes. Trifluoacetic acid is removed by distillation under reduced pressure for 10 minutes, followed by addition of cold ethyl ether to give precipitates. The precipitates are collected by filtration and dried. (Rf1; 0.0, Rf2; 0.58, Rf3; 0.62.)

Production of 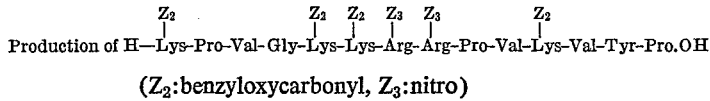

($Z_2$:benzyloxycarbonyl, $Z_3$:nitro)

(1) 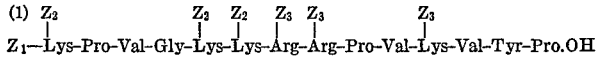

($Z_1$: t-butoxycarbonyl, $Z_2$: benzyloxycarbonyl, $Z_3$: nitro)

In 20 volume parts of dimethylformamide is dissolved 2.4 weight parts of dry powdery

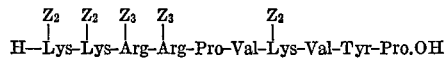

prepared in the above, followed by addition of 0.45 volume part of triethylamine. To this solution is immediately added 1.59 weight part of

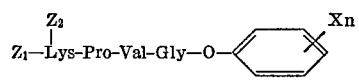

($Z_1$: t-butoxycarbonyl, X: chloro, n: 5), which is prepared by a conventional manner, and the whole mixture is vigorously stirred for 12 hours. To the reaction mixture is added 1 volume part of glacial acetic acid and 60 volume parts of cold ethyl ether. The resulting precipitates are collected by filtration and washed with ethyl ether. Yield; 3.6 weight parts (100%). Then, the product is purified by re-precipitation from acetic acid-ethanol. Yield; 3.1 weight parts (86%), melting point: 170° C. (decomposition, sintering at 142 to 147° C.), $(\alpha)_D^{23} = -36.70°$ (c.=1.0, in dimethylformamide), Rf1; 0.0, Rf2; 0.70, Rf4; 0.78.

*Elemental analysis.*—Calculated for $$C_{114}H_{164}O_{30}N_{26}2H_2O$$

(percent): C, 56.68; H, 7.01; N, 15.08. Found (percent): C, 56.50; H, 7.02; N, 15.06.

(2)

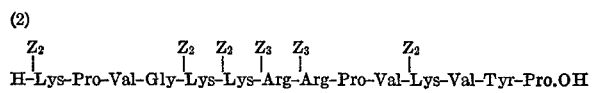

($Z_2$ and $Z_3$ have the same meaning as above).

In 15 volume parts of cold trifluoroacetic acid is dissolved 2.64 weight parts of the

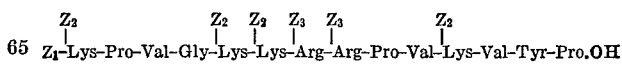

prepared in (1), followed by stirring at lower than 15° C. for 15 minutes. Trifluoroacetic acid is removed by distillation under reduced pressure for 10 minutes, followed by addition of cold ethyl ether to give precipitates. The precipitates are collected by filtration, washed with ethyl ether and dried. (Rf1; 0.0, Rf2; 0.41, Rf3; 0.61, Rf4; 0.72).

3,651,039

($Z_1$: t-butoxycarbonyl, $Z_2$: benzyloxycarbonyl, $Z_3$: nitro, tBu: tertiary butyl);

In 40 volume parts of dimethylformamide is dissolved 2.2 weight parts of dry powdery

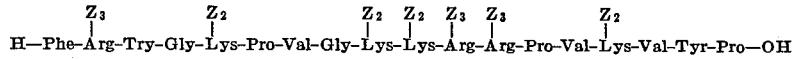

Production of H—Phe-Arg-Try-Gly-Lys-Pro-Val-Gly-Lys-Lys-Arg-Arg-Pro-Val-Lys-Val-Tyr-Pro.OH ($Z_2$: benzyloxycarbonyl, $Z_3$: nitro)

(1) $Z_1$—Phe-Arg-Try-Gly-Lys-Pro-Val-Gly-Lys-Lys-Arg-Arg-Pro-Val-Lys-Val-Tyr-Pro.OH ($Z_1$: t-butoxycarbonyl, $Z_2$: benzyloxycarbonyl, $Z_3$: nitro).

In 10 volume parts of dimethylformamide is dissolved 2.7 weight parts of dry powdery H—Lys-Pro-Val-Gly-Lys-Lys-Arg-Arg-Pro-Val-Lys-Val-Tyr-Pro.OH prepared in the above, followed by addition of 3.1 volume parts of 10% triethylamine in dimethylformamide. To this solution is added immediately

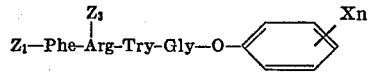

($Z_1$: t-butoxycarbonyl, $Z_3$: nitro, X: Cl, n:5), and the mixture is stirred at room temperature for 10 hours.

1 volume part of glacial acetic acid and 50 volume parts of cold ethyl ether are added to the reaction mixture, and resulting powders are collected by filtration, washed with ethyl ether and purified by re-precipitation from acetic acid-water and then from acetic acid-ethanol. Yield 3.19 weight parts (96%), melting point; 166 to 172° C. (decomposition, sintering at 149 to 158° C.), $(\alpha)_D^{23} = -36.00$ (c.=1.0, in dimethylformamide), Rf1; 0.0, Rf2; 0.58, Rf3; 0.64, Rf4; 0.78.

*Elemental analysis.*—Calculated for $C_{197}O_{36}N_{35}4H_2O$ (percent): C, 56.05; H, 6.79; N, 16.14. Found (percent): C, 56.17; H, 6.77; N, 16.04.

Amino acid analysis (hydrolyzed in 5.7 N-HCl at 105° C. for 2 hours)
Lys: 3.8, Pro: 2.7, Gly: 2.0, Val: 3.0, Phe: 1.1.

(2) H—Phe-Arg-Try-Gly-Lys-Pro-Val-Gly-Lys-Lys-Arg-Arg-Pro-Val-Lys-Val-Tyr-Pro.OH (Abbreviations have the same meaning as above).

In 20 volume parts of cold trifluoroacetic acid containing 1% of thioglycollic acid is dissolved 2.13 weight parts of $Z_1$—Phe-Arg-Try-Gly-Lys-Pro-Val-Gly-Lys-Lys-Arg-Arg-Pro-Val-Lys-Val-Tyr-Pro.OH prepared in (1), and the resulting solution is stirred at lower than 15° C. for 10 minutes, followed by distillation under reduced pressure for 5 minutes to remove trifluoroacetic acid, at the end of which time 50 volume parts of cold ethyl ether is added.

The resulting white precipitates are collected by filtration, washed with ethyl ether and dried. (Rf1; 0.0, Rf2; 0.51, Rf3; 0.59, Rf4; 0.72).

(Peptide A) prepared in the above. To the solution is added 0.25 volume part of triethylamine, and the mixture is cooled to —10° C.

On the other hand, in 12 volume parts of saturated aqueous solution of sodium chloride is suspended 0.600 weight part of

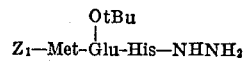

$Z_1$—Met-Glu-His—NHNH$_2$

After the suspension is cooled to 10° C., 10 volume parts of ice-cooled N-hydrochloric acid is added thereto so as to dissolve the compound. To this solution is added 1.2 volume part of N-aqueous solution of sodium nitrite, and the mixture is stirred at 5° C. for 15 minutes, at the end of which time 0.600 weight part of sodium bicarbonate and 12 volume parts of ethylacetate are added thereto and shaken.

The ethylacetate layer is washed with an ice-cooled 5% aqueous solution of sodium bicarbonate and then with water, followed by drying over sodium sulfate.

Thus treated ethyl acetate layer (azide solution) is added to the above prepared dimethylformamide solution containing the peptide A.

The mixture is stirred at —5° C. for 4 hours and then at 2° C. for further 12 hours, at the end of which time an azide solution prepared by the same manner as above is added thereto, followed by stirring at 2° C. for 24 hours. To the resulting mixture is added 1 volume part of glacial acetic acid and 200 volume parts of ethyl ether containing 0.2% of thioglycollic acid.

Resulting precipitates are collected by filtration, washed with ethyl acetate and dried. Yield 2.65 weight parts (100%).

This powder is dissolved in a solvent consisting of ethyl acetate, pyridine, acetic acid, water and thioglycollic acid (60:20:6:11:0.1 by volume). The solution is passed through a column (4 x 35 cm.) packed with silica gel so as to adsorb the object material on the silica gel, and the Production of H—Met-Glu-His-Phe-Arg-Try-Gly-Lys-Pro-Val-Gly-Lys-Lys-Arg-Arg-Pro-Val-Lys-Val-Tyr-Pro—OH ($Z_2$: benzyloxycarbonyl, $Z_3$: nitro);

(1) $Z_1$—Met-Glu-His-Phe-Arg-Try-Gly-Lys-Pro-Val-Gly-Lys-Lys-Arg-Arg-Pro-Val-Lys-Val-Tyr-Pro—OH column is subjected to effluence with the same solvent system as above at a rate of 100 volume parts/hr. Effluent fractions ranging from 150 to 300 volume parts are collected and distilled under reduced pressure to remove ethyl acetate. To the residue is added cold water, followed by standing in a cold place to give precipitates.

The precipitates are recovered by decantation, and mixed with 50 volume parts of 2% acetic acid, followed by crushing. Finally, thus obtained powder is washed with water and dried. Yield 2.0 weight parts (87%), M.P. 172°–177° C. (decomposition). Sintering at 160° C., $(\alpha)_D^{22} = -36.0°$ (c.=1.0, in dimethylformamide). Rf1; 0.0, Rf2; 0.54, Rf3; 0.61, Rf4; 0.90 (positive to Ehrlich's and Pauly's reagent).

Elemental analysis.—Calculated for $C_{157}H_{222}O_{39}N_{40}S$ (percent): C, 56.82; H, 6.71; N, 16.36; S, 0.91. Found (percent): C, 56.74; H, 6.79; N, 16.30; S, 1.18.

Amino acid analysis (hydrolyzed in 5.7 N-hydrochloric acid at 105° C. for 20 hours) Lys 3.81, His 0.94, Glu 1.12, Pro 2.70, Gly 1.98, Val 13.00, Phe 1.00

The resulting mixture is stirred at −5° C. for 6 hours and then at 2–3° C. for further 12 hours, at the end of which time the azide solution prepared by the same manner as above is added thereto, followed by stirring at 2°–3° C. for 12 hours. To thus obtained mixture is added 100 volume parts of ethyl ether containing 0.1% of thioglycollic acid and kept standing in a cold place. To the ethyl eher layer recovered by decantation is added ethylacetate to yield powdery substance, which is collected by filtration and dried. Yield 1.50 weight part (100%). This powder is dissolved in a solvent system consisting of ethylacetate, pyridine, acetic acid, water and thioglycollic acid (60:20:6:11:0.1 by volume), and the solution is passed through a column (3.5 x 27 cm.) packed with silica gel and the column is subjected to effluence with the same solvent system as above at a rate of 100 volume parts of solvent/hr. Effluent fractions ranging from 180 to 400 volume parts are collected and condensed, and to the resulting residue is added cold water to give precipitates. The precipitates are collected by filtration, washed (2)
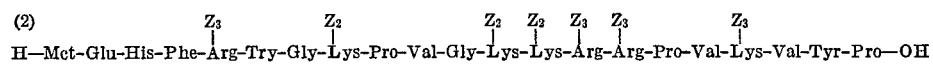
H—Met-Glu-His-Phe-Arg-Try-Gly-Lys-Pro-Val-Gly-Lys-Lys-Arg-Arg-Pro-Val-Lys-Val-Tyr-Pro—OH ($Z_2$ and $Z_3$ have the same meaning as above).

In 10 volume parts of trifluoroacetic acid containing 1% of ice-cooled thioglycollic acid is dissolved 1.38 weight part of with 1% of an aqueous solution of acetic acid containing 0.1% thioglycollic acid and then with water and dried. Yield 1.11 weight part (74%), M.P. 197°–203° C. (decomp. 164° to 168° C. Sinter), $(\alpha)_D^{22} = -32.8°$

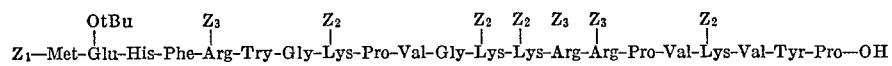
$Z_1$—Met-Glu-His-Phe-Arg-Try-Gly-Lys-Pro-Val-Gly-Lys-Lys-Arg-Arg-Pro-Val-Lys-Val-Tyr-Pro—OH and the resulting solution is stirred for 20 minutes and then condensed under reduced pressure, followed by addition of ethyl ether to give a white powder. The powder is collected by filtration, washed with ethyl ether and dried. (RF1; 0.0, Rf2; 0.2, RF3; 0.27, Rf4; 0.59)

(c.=1.0, in dimethylformamide), Rf1; 0.0, Rf2; 0.37, Rf3; 0.46, Rf4; 0.81.

Elemental analysis.—Calculated for $C_{176}H_{237}O_{47}N_{43} \cdot 2H_2O$ (percent): C, 55.99; H, 6.43; N, 15.95; S, 0.85. Found (percent): C, 56.03; H, 6.43; N, 16.02; S, 1.08.

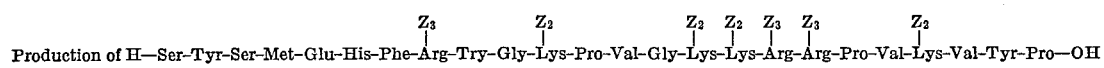
Production of H—Ser-Tyr-Ser-Met-Glu-His-Phe-Arg-Try-Gly-Lys-Pro-Val-Gly-Lys-Lys-Arg-Arg-Pro-Val-Lys-Val-Tyr-Pro—OH β(1–24)corticotropin ($Z_2$: benzyloxycarbonyl, $Z_3$: nitro):

(1) $Z_1$—Ser-Tyr-Ser-Met-Glu-His-Phe-Arg-Try-Gly-Lys-Pro-Val-Gly-Lys-Lys-Arg-Arg-Pro-Val-Lys-Val-Tyr-Pro—OH ($Z_1$: t-butoxycarbonyl)(N-protected β(1–24) corticotropin):

In 5 volume parts of dimethylformamide is dissolved 1.43 weight parts of powdery (2) β(1–24) corticotropin.—In 0.5 volume part of trifluoroacetic acid containing 0.1 volume part of anisol and 0.02 volume part of thioglycollic acid is dissolved, 0.100 weight part of the N-protected β(1–24)corticotropin pre-

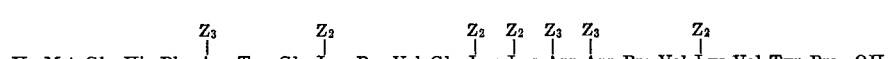
H—Met-Glu-His-Phe-Arg-Try-Gly-Lys-Pro-Val-Gly-Lys-Lys-Arg-Arg-Pro-Val-Lys-Val-Tyr-Pro—OH which is prepared above, and to the solution is added 1.7 volume part of 10% solution of triethylamine-dimethylformamide, followed by cooling to −20° C.

On the other hand, in 7 volume parts of dimethylformamide is suspended 0.252 weight part of $Z_1$—Ser-Tyr-Ser—$NHNH_2$. After the suspension is cooled to −3° C., 0.4 volume part of 6 N hydrochloric acid is added thereto so as to dissolve the compound. To this solution is added dropwise 0.15 volume part of 4 N aqueous solution of sodium nitrite. The mixture is stirred at −10° C. for 30 minutes, and 0.3 volume part of triethylamine is added thereto, followed by drying over anhydrous sodium sulfate. This treated mixture is filtered, and to the filtrate (azide solution) is added the above prepared peptide dissolved in dimethylformamide.

pared in above, and the resulting solution is cooled to −70° C. 8 volume parts of anhydorus hydrogen fluoride is added to the solution, and the mixture is warmed up to 0° C. over 20 minutes, followed by stirring at 0° C. for 1 hour, at the end of which time the hydrogen fluoride is distilled off immediately under reduced pressure.

The residue is dried over sodium hydroxide, followed by addition of 20 volume parts of water. The solution is passed through a column (1 x 10 cm.) packed with Amberlite IR–400 (acetate form) so as to convert the material to the acetate form. 100 volume parts of the thus treated solution is mixed with 0.5 volume part of thioglycollic acid and the mixture is kept at 50° C. for 10 hours. To the resultant is added a small amount of Amberlite IR–400 (OH form) under stirring, followed by filtration to remove the Amberlite. The filtrate is passed through a column (1 x 40 cm.) packed with carbomethoxy cellulose and subjected to effluence with an ammonium acetate buffer solution, whereupon the desired product is eluted out.

When this product is lyophilized, 0.057 weight part (60%) of β(1–24) corticotropin is obtained as white powder.

$(\alpha)_D^{23} = -85.4°$ (c.=1.0, in 1% acetic acid),

UV $\lambda_{max.}^{0.1N-NaOH}$ mμ ($E_{1\,cm.}^{1\%}$)

283.0 (24.75), 289.5 (25.47,
Rf2; 0.0, Rf3; 0.0, Rf4; 0.51.
Paper electrophoresis
pH 3.6 (pyridine-acetate buffer) 400 v., 4 hours, 7.5 cm. pH 1.9 (acetic acid-formic acid buffer) 450 v. 1 hour, 8 cm.

[Amino acid analysis (hydrolyzed in 5.7 N-HCl at 110° C. for 35 hours]

| Amino acid | Lys | His | Arg | Ser | Glu | Pro | Gly | Val | Met | Tyr | Phe | Try |
|---|---|---|---|---|---|---|---|---|---|---|---|---|
| Theoretical | 4 | 1 | 3 | 2 | 1 | 3 | 2 | 3 | 1 | 2 | 1 | 1 |
| Found [2] | 4.00 | 0.94 | 2.95 | 2.10 | 1.05 | 2.87 | 2.00 | 3.00 | 0.75 | 2.00 | 1.00 | 1.00 |

[1] Calculated by U.V. absorption.  [2] Average recovering rate: 90%.

EXAMPLE 3

Production of $Z_1$—β-Ala-Tyr-Ser-Met-Glu-His-Phe-Arg-Try-Gly-Lys-Pro-Val-Gly-Lys-Lys-Arg-Arg - Pro - Val-Lys-Val-Tyr—NH$_2$[β-Ala$^1$] β (1–23NH$_2$)corticotropin ($Z_1$: t-butoxycarbonyl):

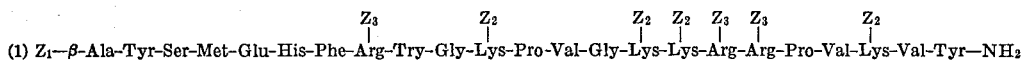

(1) $Z_1$—β-Ala-Tyr-Ser-Met-Glu-His-Phe-Arg-Try-Gly-Lys-Pro-Val-Gly-Lys-Lys-Arg-Arg-Pro-Val-Lys-Val-Tyr—NH$_2$ (N-protected tricosapeptide) ($Z_1$: t-butoxycarbonyl, $Z_2$: benzyloxycarbonyl, $Z_3$: nitro);

In 6 volume parts of trifluoroacetic acid containing 0.1 volume part of thioglycollic acid is dissolved 0.665 weight part of $Z_1$-Met-Glu-His-Phe-

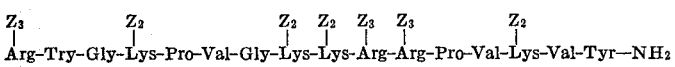

Arg-Try-Gly-Lys-Pro-Val-Gly-Lys-Lys-Arg-Arg-Pro-Val-Lys-Val-Tyr—NH$_2$ which is prepared by the above example. The resulting solution is stirred under a nitrogen stream at 20° C. for 20 minutes, at the end of which time trifluoroacetic acid is distilled off under reduced pressure at 20° C., followed by addition of 40 volume parts of ethyl ether. The resulting precipitates are collected by filtration (Rf2; 0.0, Rf3; 0.52). Thus produced powder is dissolved in 5 volume parts of dimethylformamide, and to the solution is added 0.7 volume part of 10% triethylamine in dimethylformamide, followed by cooling to −20° C.

On the other hand, in 6 volume parts of dimethylformamide is suspended 0.140 weight part of $Z_1$—β-Ala-Tyr-Ser—NHNH$_2$, a method for the preparation of which is described in the attached reference.

In the suspension is dissolved 0.2 volume part of 6 N-hydrochloric acid under shaking. The resulting solution is cooled to −10° C. and then 0.1 volume part of an N-aqueous solution of sodium nitrite is added dropwise thereto, followed by stirring at 10° C. for 30 minutes.

To the resulting reaction mixture is added 1.7 volume part of a cold (−10° C.) 10% triethylamine in dimethylformamide and the mixture is dried over anhydrous sodium sulfate, followed by filtration.

The filtrate (azide solution) is added to the above-prepared dimethylformamide solution of the peptide, followed by stirring at −10° C. for 6 hours and at 0° C. for a further 10 hours. To this reaction mixture is added the azide solution, followed by stirring at 0° C. for 24 hours.

To the resulting reaction mixture is added 50 volume parts of ethyl ether to separate out an oily substance. The ether layer is removed and ethyl acetate is added to the residue whereby the oily substance is converted to a powder. The powder is collected by filtration, washed with ethyl acetate-methanol and dried. Yield: 0.700 weight part (90%), Rf1; 0.0, Rf2; 0.60, Rf3; 0.75, Rf4; 0.91.

(2) [(β-Ala$^1$] β (1–23NH$_2$) corticotropin.—In 1 volume part of trifluoroacetic acid is dissolved 0.120 weight part of N-protected tricosapeptide prepared in (1), and 0.2 volume part of anisol and 0.05 volume part of thioglycollic acid are added thereto. The resulting mixture is cooled to −70° C. and 20 volume parts of anhydrous hydrogen fluoride is added to the solution, followed by stirring at 0°–5° C. for 1 hour.

The hydrogen fluoride is distilled off under reduced pressure and the residue is dried over sodium hydroxide, followed by dissolving in 20 parts by volume of water. The solution is passed through a column (1 x 10 cm.) packed with Amberlite IR A–400 (acetate form) and the column is washed with 100 volume parts of water.

The effluent and washing water and combined, and the whole mixture is washed twice with 70 volume parts of chloroform, followed by lyophilizing (yield: 0.120 weight part).

This product is dissolved in 5 volume parts of distilled water and 0.07 volume part of thioglycollic acid is added thereto. The mixture is kept standing at 50° C. under a nitrogen stream for 15 hours. To the resulting reaction mixture is added 65 volume parts of water, followed by passing through a column (2 x 35 cm.) packed with carbomethoxy cellulose. The column is eluted by means of the gradient elution technique (0.02 mol) ammonium acetate buffer (pH 4.8)→(0.5 mol) ammonium acetate buffer (pH 6.8), whereby the compound is collected at about 0.30–0.40 mol buffer.

The combined effluents are lyophilized to obtain 0.050 weight part of white cotton-like precipitate.

$(\alpha)_D^{22} = -73.0°$ (c.=0.5, in 1% acetic acid)

UV $\lambda_{max.}^{0.1 N-NaOH}$ mμ ($E_{1\,cm.}^{1\%}$)

284 (27.16), 290 (27.55),
Rf2; 0.0, Rf3; 0.0, Rf4; 0.54

Paper electrophoresis;
  2 N-acetic acid (600 v., 1 hour);
    mobility=Lys×0.98;
  pyridine-acetic acid-water (1:10:89) (400 v., 6 hours); mobility=Lys×0.54
  pyridine-acetic acid-water (10:0.4:90) (400 v., 3 hours); mobility=Lys×0.83.

Amino acid analysis:

| Amino acid | Lys | His | Arg | Ser | Glu | Pro | Gly | β-Ala | Val | Met | Tyr | Phe | Try [1] |
|---|---|---|---|---|---|---|---|---|---|---|---|---|---|
| Theoretical | 4 | 1 | 3 | 1 | 1 | 2 | 1 | 1 | 3 | 1 | 2 | 1 | 1 |
| Found [2] | 4.18 | 1.00 | 3.17 | 1.12 | 1.00 | 2.02 | 2.00 | 0.94 | 2.90 | 0.80 | 2.05 | 1.00 | 0.93 |

[1] Calculated by U.V. absorption.
[2] Average recovering rate 100%.

Reference $Z_1$—β-Ala-Tyr-Ser—$NHNH_2$, one of the present starting materials, is prepared in the following manner:

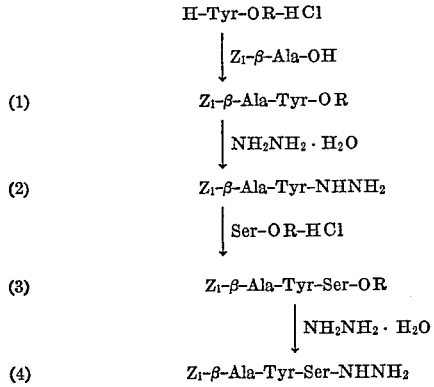

(1) To 27.84 weight parts of H—Tyr—OR·HCl (R: methyl) dissolved in 500 volume parts of acetonitrile is added 16.8 volume parts of triethylamine under ice cooling. The resulting solution is stirred for 30 minutes, at the end of which time 22.3 weight parts of $Z_1$—β-Ala—OH and 22.3 weight parts of dicyclohexylcarbodiimide (DCC) are added thereto, followed by stirring at 0° C. for 2 hours. The solution is left standing at 5° C. overnight and then 1 volume part of glacial acetic acid is added thereto, followed by filtration. The filtrate is condensed, and the residue is dissolved in 500 volume parts of ethyl acetate and washed with N-hydrochloric acid.

A 5% aqueous solution of sodium bicarbonate, followed by drying over anhydrous sodium sulfate. Ethyl acetate is distilled off to give 41.6 weight parts of gel-like solid substance. This substance is reprecipitated from ethyl acetate and petroleum ether to give the object compound.

Yield: 37.7 weight parts (94.5%)
Melting point: 78–80° C., $(\alpha)_D^{23} = +7.3°$ (c.=1.0, in methanol)

*Elemental analysis.*—Calculated for $C_{21}H_{24}O_6N_2$ (percent): C, 62.99; H, 6.04; N, 7.00. Found (percent): C, 62.99; H, 6.39; N, 7.29.

(2) To 20.2 weight parts of $Z_1$—β-Ala-Tyr—OR (R: methyl) dissolved in 100 volume parts of methanol is added 10 volume parts of hydrazine hydrate. The resulting solution is left standing at room temperature for 12 hours to precipitate out fine needles.

To the whole reaction mixture is added 100 volume parts of water, and the precipitates are collected by filtration washed with water and dried. Yield: 17.2 weight parts (85.5%), melting point: 221–223° C.

These precipitates are suspended in 200 volume parts of methanol. The suspension is boiled for 3 minutes and then cooled. The resulting precipitates are collected by filtration.

Yield: 14.7 weight parts (73%), melting point: 214–215° C.,
$(\alpha)_D^{24} = -6.7°$ (c.=1.0, dimethylformamide)

*Elemental analysis.*—Calculated for $C_{20}H_{24}O_5N_4$ (percent): C, 59.99; H, 6.04; N, 13.99. Found (percent): C, 59.84; H, 6.00; N, 13.97.

(3) 4.0 weight parts of $Z_1$—β-Ala-Tyr—$NHNH_2$ is dissolved in a mixture of 50 volume parts of water, 5 volume parts of acetic acid and 3 volume parts of concentrated hydrochloric acid, and the resulting solution is cooled to below 0° C. 6 volume parts of a 2 N-aqueous solution of sodium nitrite is added dropwise to the solution, followed by vigorous stirring for 5 minutes. The resultant is extracted with cold (0° C.) ethyl acetate. The ethyl acetate layer is washed with 5% ice-cooled sodium bicarbonate and then with water, and dried over anhydrous sodium sulfate for 30 minutes.

On the other hand, 1.56 weight parts of

H—Ser—OR·HCl (R: methyl) is suspended in 20 volume parts of ethyl acetate, followed by addition of 1.4 volume parts of triethylamine under cooling at 0° C.

To the thus obtained mixture is added the above-prepared ethyl acetate solution, whereby there are yielded precipitates.

The ethyl acetate is distilled off, and the precipitates are, after addition of water, collected by filtration, washed with water and dried.

Yield: 3.50 weight parts, melting point: 145–150° C. The precipitates are re-precipitated from ethyl acetate-methanol to obtain fine needles. Yield: 2.25 weight parts (41.2%), melting point: 191–193° C., Rf1: 0.46, Rf2: 0.92, $(\alpha)_D^{24} = -1.6°$ C. (c.=1.0, in dimethylformamide).

*Elemental analysis.*—Calculated for $C_{24}H_{29}O_8N_3$ (percent): C, 59.13; H, 6.00; N, 8.62. Found (percent): C, 58.71; H, 6.06; N, 8.70.

(4) 0.975 weight part of $Z_1$—β-Ala-Tyr-Ser—OR (R: methyl) is suspended in 10 volume parts of methanol, and 7 volume parts of dimethylformamide is added thereto under heating so as to dissolve the above peptide component, followed by cooling. To the solution is added 1.0 volume part of hydrazine hydrate and the mixture is left standing at room temperature for 20 hours. The resulting fine needles are collected by filtration, washed with methanol and dried. Yield; 0.840 weight part (86%), melting point; 216° C.

The precipitates are re-precipitated from dimethylformamide-water to the desired object compound.

Yield; 0.750 weight part (77%), melting point; 234° C. (decomp.) Rf2; 0.60, Rf4; 0.83, $(\alpha)_D^{24} = -4.20°$ (c.=1.0, in dimethylformamide)

*Elemental analysis.*—Calculated for $C_{23}H_{29}O_7N_5$ (percent): C, 56.66; H, 6.00; N, 14.37. Found (percent): C, 56.46; H, 5.71; N, 14.46.

EXAMPLE 4

Production of H—Gaba-Tyr-Ser-Met-Glu-His-Phe-Arg-Tyr-Gly - Lys-Pro-Val-Gly-Lys-Arg-Arg-Pro-Val-Lys-Val-Tyr-Pro—OH (Gaba: γ-aminobutyric acid)

(1) $Z_1$—Gaba-Tyr—OMe ($Z_1$: t-butoxycarbonyl).— To 22.3 weight parts of H—Tyr.—OR.HCl (R: methyl) dissolved in 400 volume parts of acetonitrile is added 13.5 volume parts of triethylamine under ice-cooling. The resulting solution is stirred for 30 minutes, at the end of which time 18.9 weight parts of $Z_1$—Gaba—OH and 20 weight parts of dicyclohexylcarbodiimide (DCC) are added thereto, followed by stirring at 0° C. for 2 hours. The solution is left standing at 5° C. overnight and then 1 volume part of glacial acetic acid is added thereto, followed by filtration. The filtrate is condensed, and the residue is dissolved in 500 volume parts of ethyl acetate and washed with N-hydrochloric acid and a 5% aqueous solution of sodium bicarbonate, followed by drying over anhydrous sodium sulfate. Thus treated solution is distilled to remove ethyl acetate, whereby 31.8 weight parts (80%) of oily substance is obtained. Rf1; 0.62.

(2) $Z_1$—Gaba-Tyr.—$NHNH_2$.—To 30 weight parts of $Z_1$—Gaba-Tyr.—OR (R: methyl) dissolved in 200 volume parts of methanol is added 10 volume parts of hydrazine

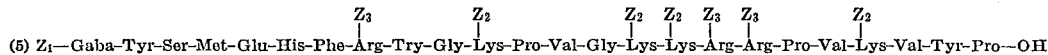

(5) $Z_1$—Gaba-Tyr-Ser-Met-Glu-His-Phe-Arg-Try-Gly-Lys-Pro-Val-Gly-Lys-Lys-Arg-Arg-Pro-Val-Lys-Val-Tyr-Pro—OH hydrate. The resulting solution is left standing at room temperature for 20 hours. The resulting precipitates are cent): C, 57.47; H, 6.23; N, 13.97. Found (percent): C, 57.22; H, 6.22; N, 14.01.

($Z_2$; benzyloxycarbonyl; $Z_3$: nitro);

In 25 volume parts of dimethylformamide is dissolved 0.72 weight part of powdery

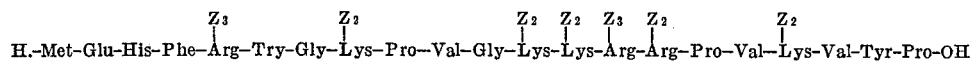

H.-Met-Glu-His-Phe-Arg-Try-Gly-Lys-Pro-Val-Gly-Lys-Lys-Arg-Arg-Pro-Val-Lys-Val-Tyr-Pro-OH collected by filtration and suspended in 200 volume parts of methanol. The suspension is boiled for 5 minutes and then cooled. The resulting precipitates are collected by filtration. Yield; 25.7 weight parts (86%), melting point; 198 to 200° C., $(\alpha)_D^{22}=-5.0°$ (c.=1.0 in dimethylformamide).

Elemental analysis.—Calculated for $C_{21}H_{26}O_5N_4$ (percent): C, 60.85; H, 6.32; N, 13.52. Found (percent): C, 60.98; H, 6.35; N, 13.35.

(3) $Z_1$—Gaba-Tyr-Ser—OMe.—8.28 weight parts of $Z_1$—Gaba-Tyr—$NHNH_2$ is dissolved in a mixture of 80 volume parts of dimethylformamide and 40 volume parts of 2 N-hydrochloric acid, and the resulting solution is cooled to —5° C. or lower. 5 volume parts of 2 N-aqueous solution of sodium nitrite is added dropwise to the solution, followed by vigorously stirring for 5 minutes. To the resulting action mixture is added 200 volume parts of ice-cooled water and the solution is extracted with cold ethyl acetate. The ethyl acetate layer is washed with a 5% ice-cooled aqueous solution of sodium bicarbonate and then with water, and dried over anhydrous sodium sulfate for 30 minutes.

On the other hand, 3.12 weight parts of H—Ser—OR. HCl (R: methyl) is suspended in 50 volume parts of ethyl acetate, followed by addition of 2.8 volume parts of triethylamine under cooling at 0° C. To thus obtained mixture is added the above-prepared ethyl acetate solution, whereby there are yielded precipitates. The precipitates are, after addition of 200 volume parts of ethyl ether, collected by filtration. The precipitates are dissolved in ethanol and the solution is condensed to yield crystals, which are collected by filtration and washed with ethyl acetate. Yield; 6.3 weight parts (61%), melting point; 152 to 154° C. Rf1; 0.5, $(\alpha)_D^{22}=-1.8°$ (c.=1.0 in dimethylformamide).

Elemental analysis.—Calculated for $C_{25}H_{31}O_8N_3$ (percent): C, 59.87; H, 6.24; N, 8.38. Found (percent): C, 59.70; H, 6.19; N, 8.47.

(4) $Z_1$—Gaba-Tyr-Ser—$NHNH_2$.—5.02 weight parts of $Z_1$—Gaba-Tyr-Ser—OR (R: methyl) is dissolved in 80 volume parts of methanol, followed by cooling. To the solution is added 5.0 volume parts of hydrazine hydrate and the mixture is left standing at room temperature for 24 hours. The resulting precipitates are collected by filtration, washed with methanol, and dried. Yield; 4.9 weight parts (98%) melting point; 193 to 206° C. (decomposition). The precipitates are reprecipitated from dimethylformamide-water. Yield; 3.8 weight parts (76%), melting point; 218 to 220° C. (decomposition), Rf2; 0.75, $(\alpha)_D^{23}=-1.5°$ (c.=1.0 in 1 N-hydrochloric acid).

Elemental analysis.—Calculated for $C_{24}H_{31}O_7N_5$ (percent): C, 57.47; H, 6.23; N, 13.97. Found (percent): C, 57.22; H, 6.22; N, 14.01.

which is prepared as above, and to the solution is added 1.7 volume part of 10% triethylamine in dimethylformamide, followed by cooling to —10° C.

On the other hand in 6 volume parts of hot dimethylformamide is dissolved 0.151 weight part of $Z_1$—Gaba-Tyr-Ser—$NHNH_2$. After the solution is cooled to —10° C., 0.2 volume part of 6 N-hydrochloric acid is added thereto. To this solution is added dropwise 0.1 volume part of 4 N-aqueous solution of sodium nitrite. The mixture is stirred at —10° C. for 30 minutes, and 1.7 volume part of a 10% triethylamine in dimethylformamide is added thereto, followed by drying over anhydrous sodium sulfate. The thus treated mixture is filtered, and to the filtrate (azide solution) is added the above prepared peptide dissolved in dimethylformamide. The resulting mixture is stirred at —5° C. for 6 hours and then 2 to 4° C. for further 12 hours, at the end of which time an azide solution prepared by the same manner as above is added thereto, followed by stirring at 2 to 4° C. for 40 hours. To the thus obtained mixture is added 80 volume parts of ethyl ether containing 0.1% of thioglycollic acid and kept standing at a cold place. To the ethyl ether layer recovered by decantation is added ethyl acetate to yield a powdery substance, which is collected by filtration and dried. This powder is dissolved in a solvent consisting of ethyl acetate, pyridine, acetic acid, water and thioglycollic acid (60:20:6:11:0.1 by volume), and the solution is passed through a column (3 x 20 cm.) packed with silica gel so as to adsorb the object material on silica gel, and the column is subjected to an effluence with the same solvent system as above at a rate of 100 volume parts/hr. Effluent fractions ranging from 70 to 430 volume parts are collected and condensed, and to the resulting residue is added cold water to give precipitates. The precipitates are collected by filtration, washed with a 1% aqueous acetic acid solution containing 0.1% thioglycollic acid, and then with water and dried. Yield; 0.496 weight part (67%), melting point; 215° C. (decomposition, 168 to 176° C. sintering), $(\alpha)_D^{22}=-32.2°$ (c.=1.0 in dimethylformamide) Rf1; 0.0, Rf2; 0.28, Rf3; 0.68, Rf4; 0.82.

Elemental analysis.—Calculated for $C_{177}H_{239}O_{46}N_{43}S$ ·$6H_2O$ (percent): C, 55.28; H, 6.58; N, 15.66; S. 0.83. Found (percent): C, 55.20; H, 6.40; N, 15.42; S, 0.77.

(6) Gaba$^1$-β(1–24)corticotropin.—In 1.0 volume part of trifluoroacetic acid containing 0.2 volume part of anisol and 0.04 volume part of thioglycollic acid is dissolved 0.200 weight part of the N-protected Gaba$^1$-(1–24) β-corticotropin prepared as above, and the resulting solution is cooled to —70° C. 15 volume parts of anhydrous hydrogen fluoride is added to the solution, and the mixture is warmed up to 0° C. over 20 minutes, followed by stirring at 0° C. for 1 hour, at the end of which time the hydrogen fluoride is distilled off immediately under reduced pressure. The residue is dried over sodium hydroxide, followed by addition of 20 volume parts of water. The solution is passed through a column (1 x 20 cm.) packed with Amberlite IR-400 (acetate form) so as to convert the material to the acetate form. 100 volume parts of thus treated solution is mixed with 1 volume part of thioglycollic acid and the mixture is kept standing at 50° C. for 15 hours. To the resultant is added a small amount of Amberlite IR-400 (OH form) under stirring, followed by filtration to remove the Amberlite. The filtrate is passed through a column (1 x 40 cm.) packed with carbomethoxy cellulose and subjected to effluence with an ammonium acetate buffer solution, whereupon the desired product is eluted out. When this product is lyophillized, 0.076 weight part (40%) of Gaba[1] (1–24) β-corticotropin is obtained as white powder.

$(\alpha)_D^{22} = -83.7°$ (c.=0.5 in 1% acetic acid)

UV $\lambda_{max.}^{0.1 \, N-NaOH}$ m$\mu$ (E$_{1\,cm.}^{1\%}$)

283.0 (22.06), 289.5 (23.08)
Rf2; 0.0, Rf4; 0.575
Paper electrophoresis
pH 1.9 (acetic acid-formic acid buffer) 450 v. 1 hour 9.7 cm.,
Amino Acid Analysis (hydrolyzed in 5.7 N HCl at 110° C. for 24 hours):

| Amino acid | Lys | His | Gaba | Arg | Ser | Glu | Pro | Gly | Val | Met | Tyr | Phe | Try[1] |
|---|---|---|---|---|---|---|---|---|---|---|---|---|---|
| Theoretical | 4 | 1 | 1 | 3 | 1 | 1 | 3 | 2 | 3 | 1 | 2 | 1 | 1 |
| Found | 4.00 | 0.84 | 1.00 | 3.00 | 1.17 | 1.25 | 3.08 | 2.00 | 3.08 | 0.92 | 2.00 | 1.00 | 1.00 |

[1] Calculated by U.V. absorption.

EXAMPLE 5

Production of H—β-Ala-Tyr-Ser-Met-Glu His Phe-Arg-Try - Gly - Lys-Pro-Val-Gly-Lys-Lys-Arg-Arg-Pro-Val-Lys-Val-Tyr-Pro—OH (β-Ala[1]β (1–24)corticotropin):

In a similar manner to the foregoing examples, there is obtained the β-Ala[1]β (1–24)corticotropin, which has the following properties;

$(\alpha)_D^{22} = -86.7°$ (c.=1.0, in 1% acetic acid)

UV $\lambda_{max.}^{0.1\% \, NaOH}$ m$\mu$ (E$_{1\,cm.}^{1\%}$)

283.0 (22.00) 289.5 (22.64)
Rf2; 0.0, Rf4; 0.6
Paper electrophoresis
pH 1.9 (acetic acid-formic acid buffer) 450 v. hour 9.5 cm.
Amino Acid Analysis (hydrolyzed in 5.7 H–HCl at 110° C. for 24 hours):

| Amino acid | Lys | His | Arg | Ser | Glu | Pro | Gly | Val | Met | Tyr | Phe | β-Ala | Try[1] |
|---|---|---|---|---|---|---|---|---|---|---|---|---|---|
| Theoretical | 4 | 1 | 3 | 1 | 1 | 3 | 2 | 3 | 1 | 2 | 1 | 1 | 1 |
| Found | 4.00 | 1.12 | 2.96 | 1.20 | 1.20 | 3.04 | 2.00 | 3.12 | 0.96 | 2.00 | 1.04 | 1.14 | 1.00 |

[1] Calculated by U.V. absorption.

What is claimed is:
1. A peptide of the formula: β-alanyl-L-tyrosyl-L-seryl-L - methionyl - L - glutamyl-L-histidyl-L-phenylalanyl-L-arginyl-L-tryptophyl-glycyl - L - lysyl - L - prolyl-L-valyl-glycyl - L - lysyl-L-lysyl-L-arginyl - L - arginyl-L-prolyl-L-valyl-L-lysyl-L-valyl-L-tyrosyl—NH$_2$.

2. A peptide of the formula: γ-aminobutyryl-L-tyrosyl-L-seryl - L - methionyl-L-glutamyl-L-histidyl-L-phenylalanyl-L-arginyl - L - tryptophyl-glycyl - L - lysyl-L-prolyl-L-valyl - glycyl-L-lysyl-L-lysyl-L-arginyl-L-arginyl-L-prolyl-L-valyl-L-lysyl-L-valyl-L-tyrosyl-L-proline.

3. A peptide of the formula: β-alanyl-L-tyrosyl-L-seryl-L - methionyl - L - glutamyl-L-histidyl-L-phenylalanyl-L-arginyl-L-tryptophyl - glycyl-L-lysyl-L-prolyl-L-valyl-glycyl-L-lysyl-L-arginyl - L - arginyl-L-prolyl-L-valyl-L-lysyl-L-valyl-L-tyrosyl-L-proline.

References Cited

UNITED STATES PATENTS

| | | | |
|---|---|---|---|
| 3,228,926 | 1/1966 | Kappeler et al. | 260—112.5 |
| 3,247,180 | 4/1966 | Schwyzer et al. | 260—112.5 |
| 3,247,182 | 4/1966 | Schwyzer et al. | 260—112.5 |
| 3,345,354 | 10/1967 | Kappeler et al. | 260—112.5 |
| 3,352,844 | 11/1967 | Bolssonnas et al. | 260—112.5 |
| 3,388,112 | 6/1968 | Geiger et al. | 260—112.5 |
| 3,503,951 | 3/1970 | Iselin et al. | 260—112.5 |

FOREIGN PATENTS

| | | | |
|---|---|---|---|
| 1,500,968 | 10/1967 | France | 260—112.5 |

OTHER REFERENCES

Bajusz et al., Peptides, John Wiley and Sons, New York (1967), pp. 209–213 90431 E8 1966.

Geiger et al. II, Z, Naturforschg. 19B, 858–860 (1964).

Kapoor, J. Pharm. Sci. 56, 1532–1533 (1967).

Kovacs et al., J. Am. Chem. Soc. 87, 118–119 (1965).

Sakakibara et al. I, Bull. Chem. Soc. Japan 37, 1231–1232 (1964).

Sakakibara et al. II, Bull. Chem. Soc. Japan 40, 2164–2167 (1967).

Sakakibara et al. III, Peptides, John Wiley and Sons, New York (1967). pp. 44–49. QD 431 E8 1966.

Sakakibara et al. IV, Bull Chem. Soc. Japan 41, 438–441 (1968).

Fujino et al. Chem. Pharm. Bull. (Tokyo) 16, 929–932 (1968).

Geiger et al., Ann. 726 177–187 (1969).

LEWIS GOTTS, Primary Examiner

M. KASSENOFF, Assistant Examiner

U.S. Cl. X.R.

424—179